April 26, 1932.   P. L. TERRY   1,855,326
CORN CULTIVATOR
Filed July 6, 1928
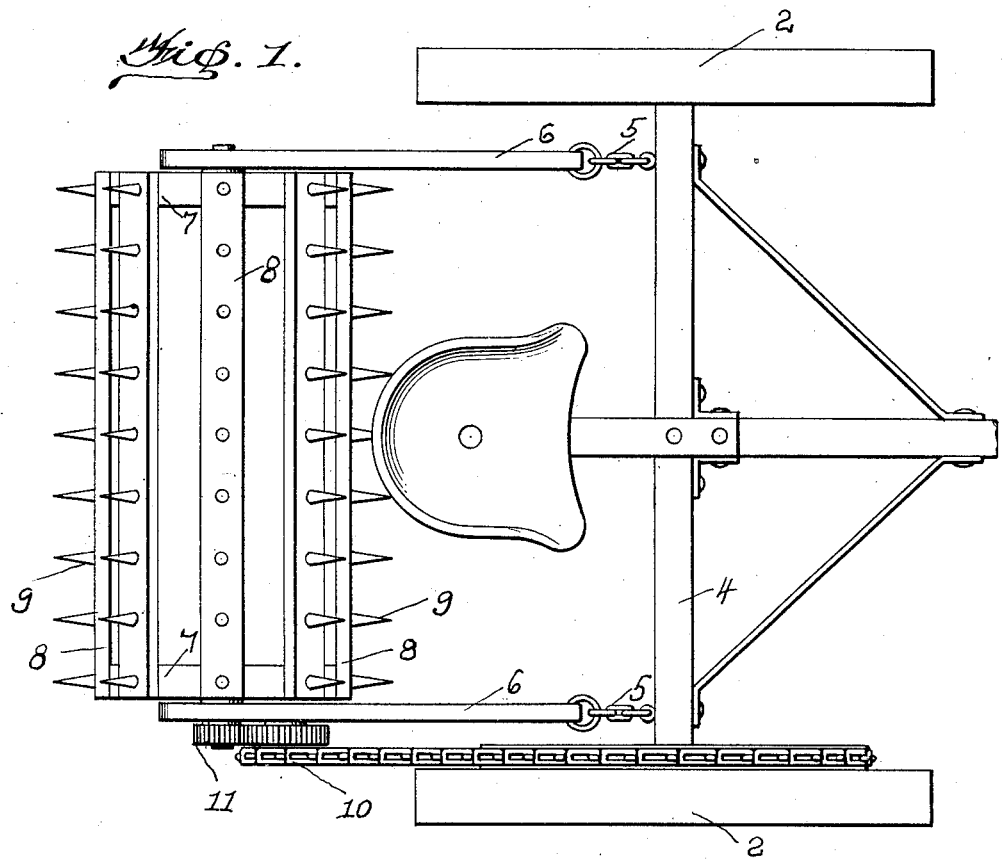
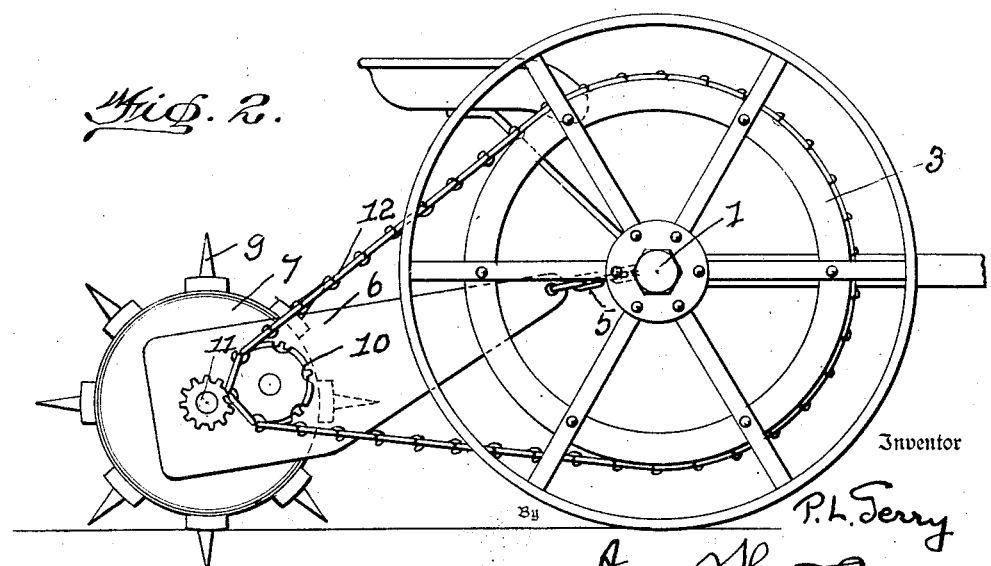

Patented Apr. 26, 1932

1,855,326

UNITED STATES PATENT OFFICE

PATRICK L. TERRY, OF BARABOO, WISCONSIN

CORN CULTIVATOR

Application filed July 6, 1928. Serial No. 290,757.

My present invention pertains to cultivators and is more particularly adapted for the cultivation of corn and it contemplates the provision of a device through the medium of which pulling and dragging of the young corn from the soil will be eliminated and will in no way interfere with the growing of said young corn.

The invention in all of its details will be fully understood from the following description and claim when the same are read in connection with the drawings accompanying and forming part of this invention, in which Figure 1 is a top plan view of my novel device.

Figure 2 is a side elevation thereof.

Similar numerals of reference designate corresponding parts in both views of the drawings.

My novel cultivator comprises an axle 1, that is preferably formed of steel and is supported above the ground by means of large traction wheels 2.

Mounted on and revoluble with one of the wheels 2 is a large sprocket gear or wheel 3. Secured to the axle which is about six feet in length I attach a piece of timber 4. This piece of timber is adapted to act as a support for the means I provide for securing the cylinder hereinafter referred to and in conjunction with the axle. The said means comprises chains 5 that in turn connect with a ring that is secured to shoes 6 as illustrated.

The cylinder is preferably about two feet in diameter and consists of the end portions 7 that in turn support preferably seven or eight bars 8 that in turn are provided with about fifteen teeth 9. Each bar as before stated may be provided with fifteen teeth, although I do not confine myself to any particular number but there will be approximately one hundred of these teeth arranged in the cultivator.

Mounted on the cylinder is a large toothed gear 10 and a smaller pinion gear 11 that mesh with each other and consequently when the sprocket chain 12 that passes around the gear 3 and large pinion 10 rotates the small pinion 11 will cause the cylinder to rotate backwardly with respect to the direction of movement of the cultivator.

The shoes 6 because of the manner in which they are attached to the chain 5 and the cylinder 7 cause said cylinder to be lifted or lowered when necessary and thereby regulates the depth the teeth of the cylinder will take into the soil.

It will be manifest from the foregoing that with my novel cultivator, dragging or pulling of the young corn is eliminated and injury to the crop is overcome. By the old method of cultivation the drags in use pull the corn from the soil and do quite an amount of damage to the crop.

As illustrated my cultivator covers corn that is planted four feet apart with the traction going outside the rows of corn and I would distinctly have it understood that the device may be made so that it covers two or three rows of corn and also the cylinder may be made larger or smaller and the number of teeth increased or decreased when occasion demands.

I would distinctly have it understood that the cylinder may be revolved in either direction that is forwardly or backwardly and any means compatible with the invention may be used to revolve the cylinder and if desired two or more cylinders may be mounted on the cultivator.

What I claim is:

A cultivator comprising a frame, an axle mounted on the frame traction wheels arranged on the axle, a large sprocket gear arranged on and revoluble with one of the traction wheels, shoes depending from the frame and adapted to be raised and lowered with respect thereto, a shaft arranged in the shoes on the outer ends thereof, a small toothed pinion arranged on one end of the axle, a cylinder mounted on the axle and revoluble thereby and having teeth formed therein, a small shaft mounted in one of the shoes in close proximity to the first shaft, a large pinion formed on the second shaft and adapted to mesh with the small toothed pinion of the first shaft whereby rotary movement of the large pinion will impart a reverse direction of movement to the small pinion, first named shaft and cylinder, a small sprocket wheel arranged on the second shaft adjacent the large pinion, and a sprocket chain adapted to engage the large sprocket wheel and small sprocket wheel whereby rotary movement of the traction wheels will impart movement from the large to the small sprocket wheels.

In testimony whereof I have hereunto set my hand.

PATRICK L. TERRY.